(12) United States Patent
Diehl et al.

(10) Patent No.: US 9,080,589 B2
(45) Date of Patent: *Jul. 14, 2015

(54) HOLLOW ELEMENT FOR ATTACHMENT TO A COMPONENT COMPRISING A COMPOSITE MATERIAL

(71) Applicant: PROFIL Verbindungstechnik GmbH & Co. KG, Friedrichsdorf (DE)

(72) Inventors: Oliver Diehl, Bad Homburg v.d.H. (DE); Richard Humpert, Bad Nauheim (DE); Andreas Lembach, Darmstadt (DE); Christian Sowa, Offenbach (DE)

(73) Assignee: PROFIL VERBINDUNGSTECHNIK GMBH & CO. KG, Friedrichsdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/272,802

(22) Filed: May 8, 2014

(65) Prior Publication Data

US 2014/0241831 A1  Aug. 28, 2014

Related U.S. Application Data

(62) Division of application No. 13/745,294, filed on Jan. 18, 2013, now Pat. No. 8,753,054.

(30) Foreign Application Priority Data

Jan. 20, 2012  (DE) .......... 10 2012 001 088

(51) Int. Cl.
*F16B 39/00* (2006.01)
*F16B 37/00* (2006.01)
(Continued)

(52) U.S. Cl.
CPC ............. *F16B 37/00* (2013.01); *B23P 19/062* (2013.01); *B29C 65/568* (2013.01);
(Continued)

(58) Field of Classification Search
USPC ......... 411/172, 179, 190–191, 201, 204, 212, 411/214, 427, 500–501, 509
See application file for complete search history.

(56) References Cited

U.S. PATENT DOCUMENTS 2,432,949 A * 12/1947 Thorngren ............ 29/512
4,831,698 A *  5/1989 Muller .................. 29/512
(Continued)

FOREIGN PATENT DOCUMENTS

DE  71 32 776    11/1971
DE  42 31 715     4/1993
(Continued)

OTHER PUBLICATIONS

German Search Report dated Nov. 6, 2012, issued in German Patent Application No. 10 2012 001 088.5.
(Continued)

*Primary Examiner* — Roberta Delisle
(74) *Attorney, Agent, or Firm* — Hershkovitz & Associates, PLLC; Abraham Hershkovitz; Eugene Rzucidlo

(57) ABSTRACT

A hollow element such as a hollow rivet or a nut element for attachment to a component consisting of a composite material such as a fiber reinforced plastic part or a fabric reinforced plastic part is presented. The element has a flange part and a shaft part extending away from the flange part and/or a rivet section, wherein the rivet section, is present, can also be formed at the free end of the shaft part, with the a hollow element furthermore having a central passage, which is optionally provided with a thread cylinder. The hollow element is used in combination with an auxiliary tip which is either inserted from the flange side of the element through the passage, or from the side of the free end of the shaft part of the rivet section into the passage, such that a conically converging region of the auxiliary tip projects from the free end of the shaft part or of the rivet section.

10 Claims, 11 Drawing Sheets

(51) Int. Cl.
*F16B 19/08* (2006.01)
*F16B 39/02* (2006.01)
*B23P 19/06* (2006.01)
*F16B 37/06* (2006.01)
*B29C 65/56* (2006.01)
*B29C 65/00* (2006.01)
*B29C 65/60* (2006.01)
*B29C 65/74* (2006.01)

(52) U.S. Cl.
CPC .......... *B29C 65/607* (2013.01); *B29C 65/7457* (2013.01); *B29C 66/0242* (2013.01); *B29C 66/02242* (2013.01); *B29C 66/12441* (2013.01); *B29C 66/30325* (2013.01); *B29C 66/474* (2013.01); *B29C 66/721* (2013.01); *B29C 66/83221* (2013.01); *F16B 19/08* (2013.01); *F16B 19/086* (2013.01); *F16B 37/065* (2013.01); *F16B 37/068* (2013.01); *F16B 39/025* (2013.01); *B29C 66/7212* (2013.01); *B29C 66/72141* (2013.01); *B29C 66/72143* (2013.01)

(56) References Cited

U.S. PATENT DOCUMENTS 8,221,040 B2 * 7/2012 Babej et al. .................. 411/183
2004/0071526 A1 4/2004 Lesecq
2009/0196678 A1 * 8/2009 Babej et al. .................. 403/19
2009/0218168 A1 * 9/2009 Diehl et al. .................. 184/1.5
2010/0135744 A1 6/2010 Babej et al.
2010/0209210 A1 * 8/2010 Kovac et al. .................. 411/172

FOREIGN PATENT DOCUMENTS

| DE | 692 30 291 | 6/2000 |
| DE | 603 00 968 | 5/2006 |
| DE | 10 2006 007 706 | 8/2007 |
| DE | 20 2006 008 721 | 10/2007 |
| DE | 603 13 261 | 1/2008 |
| DE | 10 2009 017 282 | 11/2009 |

OTHER PUBLICATIONS

English Translation of German Search Report dated Nov. 6, 2012, issued in German Patent Application No. 10 2012 001 088.5.
Translation of Abstract of DE 42 31 715.
Translation of Abstract of DE 603 13 261.
Translation of Abstract of DE 692 30 291.
Extended European Search Report mailed on May 21, 2013, in corresponding European Application No. EP 13 15 1947.
English Abstract of DE 10 2006 007 706.

* cited by examiner

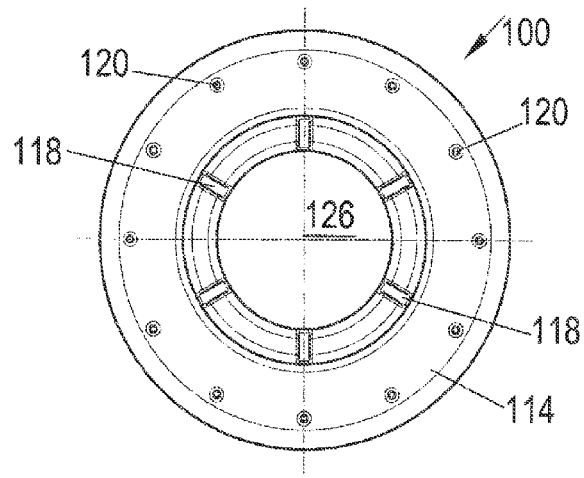
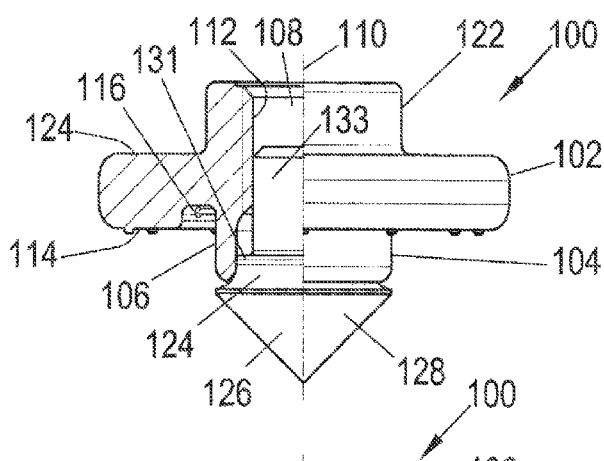
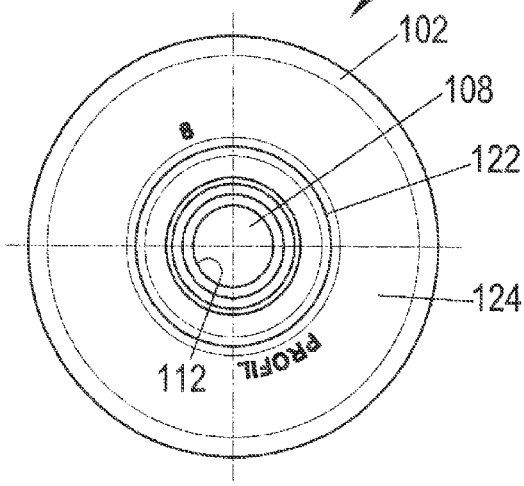

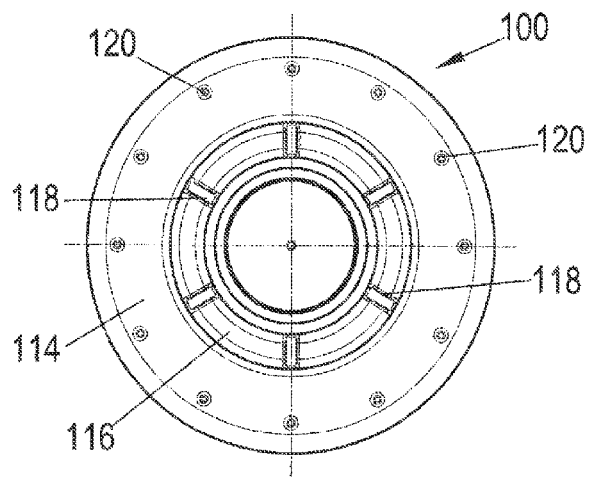
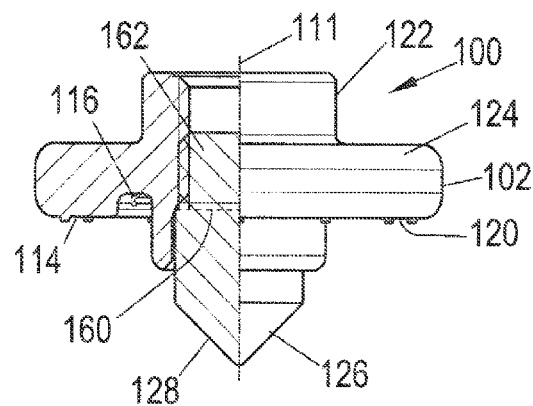
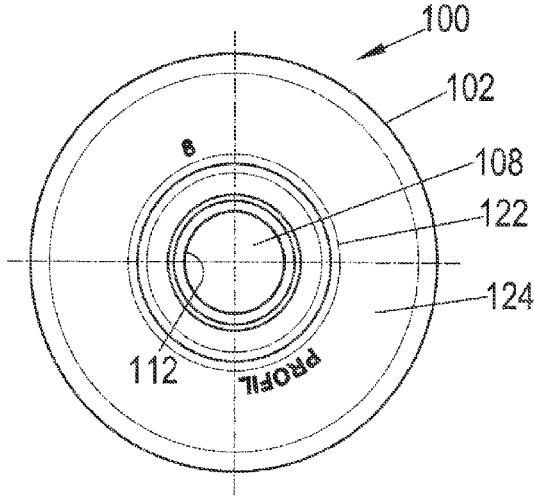

HOLLOW ELEMENT FOR ATTACHMENT TO A COMPONENT COMPRISING A COMPOSITE MATERIAL

CROSS-REFERENCE TO RELATED APPLICATIONS

The present application is a divisional application of U.S. application Ser. No. 13/745,294 filed on Jan. 18, 2013 which claims priority under 35 U.S.C. §119 to German Patent Application No. 10 2012 001 088.5, filed on Jan. 20, 2012, the disclosures of which are expressly incorporated by reference herein in their entireties.

FIELD OF THE INVENTION

The present invention relates to a hollow element such as a hollow rivet or a nut element for attachment to a component consisting of a composite material such as a fiber reinforced plastic part or a fabric reinforced plastic part.

BACKGROUND OF THE INVENTION

Composite materials are frequently used in most diverse areas and consist mainly of plastic with embedded fiber reinforcement The fiber reinforcement can for example take the form of tapes, fabrics, felts and mats. For example, coachwork parts of polyester resins reinforced with glass fibers and plastics such as epoxy resins reinforced with carbon fibers are frequently used in motor car construction and numerous further components such as consoles and cladding are likewise manufactured from such composite materials. When using carbon fibers as a reinforcement, fabrics of carbon fibers are frequently used because one can then obtain a reinforcement in all directions of the component.

The field of composite materials is however in no way restricted to glass fibers and carbon fibers there are many other reinforcement fibers which can be considered. Furthermore, the most diverse plastics can also be used as a matrix material. All such materials are described here generically as composite materials or fiber reinforced plastics. They can also be described by the generic term "organic sheet metals". This term is understood in some circles as a specialist term. The present invention primarily uses those composite materials which use a thermplastic material, i.e. a thermoplastic as matrix material which softens or becomes pasty at elevated temperatures below the melting point. It is however not precluded that duroplastics can also be used as a matrix material provided these are adequately soft or become soft or pasty at elevated temperature, i.e. at temperatures which lie beneath the temperatures at which the matrix material is permanently damaged. The method claimed here can also be used for composite materials with matrix materials which are indeed not thermoplastics but have not yet reached their final state but rather are present in a state in which they soften with or without heating but which can be transferred into a harder state in the course of time or by the action of ultraviolet light or humidity or otherwise through progressive polymerization or cross-linking.

It is frequently necessary to use components of composite materials with fastener elements, for example in order to secure the corresponding components to other parts or to attach other parts to the fiber reinforced plastic components.

Both rivet elements and also bolt or nut elements can be considered which can all be subsumated under the term functional elements. This term applies also for clips and bearings which can likewise be secured to composite materials. Irrespective of what form such functional elements have it is always necessary to provide a hole or a plurality of holes in a plastic part in order to enable the attachment of the respective desired functional element, unless threaded inserts or eyes are integrated into the plastic component during the manufacture of the component, which is however very time consuming and complicated and leads to further costs and sometimes makes a local thickening of the plastic part necessary. The manufacture of holes is mainly achieved by a drilling process, whereby material residues such as cuttings arise and the composite material is weakened in the region of the bore.

It is conceivable to punch the component in order to generate the holes as required, whereby waste in the form of punching slugs which has to be dispensed of arises as well as a local weakening of the component.

Composite materials consist of any desired reinforcement material or fibers and any desired plastically deformable or meltable matrix material. The term "composite materials" as used here in accordance with the invention includes therefore not only plastics with fiber reinforcement but, for example, also matrix materials of metal, for example aluminum, with a reinforcing material, such as for example carbon fibers or ceramic particles.

SUMMARY OF THE INVENTION

The object of the present invention is to provide a hollow element and an auxiliary means which makes it possible to provide at least substantially loss-free holes without pronounced weakening of the component, in particular for the reception of hollow functional elements such as rivets or nut elements (rivet nuts and press-in nuts).

In order to satisfy this object a hollow element is provided such as a hollow rivet or a nut element for attachment to a component consisting of a composite material such as a fiber reinforced plastic part or a fabric reinforced plastic part, wherein the element has a flange part and a shaft part extending away from the flange part and/or a rivet section, wherein the rivet section, if present, can also be formed at the free end of the shaft part, wherein the hollow element furthermore has a central passage, which is optionally provided with a thread cylinder, characterized in that the hollow element can be used in combination with an auxiliary tip which is either inserted from the flange side of the element through the passage or from the side of the free end of the shaft part of the rivet section into the passage, such that a conically converging region of the auxiliary tip projects from the free end of the shaft part or of the rivet section respectively.

With an auxiliary tip the component can be pierced during attachment of the hollow element and indeed not by a drilling or punching process but rather instead such that the tip progressively pierces the component and increasingly displaces the material of the component towards the outside around the point of first penetration, until a hole of the desired size is provided for receiving the shaft part of the hollow element.

Through the lateral displacement of the material of the component, which was previously present in the area of the hole, a thickening of the component arises at one or both sides of the hole (depending on whether and how the component was locally supported during the piercing process) and the so accumulated material can subsequently be displaced into grooves and/or undercuts of the hollow element and brought into engagement with features providing security against rotation and is thus always still arranged close to the hole margin, i.e. at a point around the hole margin in which it locally reinforces the component, and indeed at a point which would otherwise be weakened. Since the material of the component, i.e. both the matrix material and also the reinforcement fibers is or are displaced by the auxiliary tip, the accumulation of material at the hole margin is likewise reinforced and serves for high quality attachment of hollow elements to the component and guards against fatigue cracks and other sources of failure.

Even if the material is first thickened at the side of the component remote from the flange part of the hollow element, this side can either be pressed flat, which in any event occurs during the press fitting of the component with the hollow element or during the beading over of the rivet section and during the displacement of the material of the component into any grooves and/or undercuts and into contact with the surface of features providing security against rotation. In this way a highly desired planar screw-on surface arises at the side of the component remote from the flange part.

It is particularly favorable when features providing security against rotation are provided in the region of the flange part in order to form a security against rotation between the hollow element and the component. Since, with a composite material, the flange part and the corresponding annular contact surface must be made relatively large in order to keep the surface pressure acceptable, the features providing security against rotation can also be made relatively large and can thus be very effective even if of small height.

The flange part can, for example, be provided with an annular planar contact surface which is equipped with discrete axial projections which can be pressed into the matrix material of the component. Such projections can be arranged radially, outwardly at the annular contact surface, i.e. at positions where they bring about a relatively high security against rotation for a small size. The projections can be flattened off or gently rounded at the highest points so that they do not damage the fiber reinforcement of the composite material.

The hollow element preferably has not only an annular planar contact surface at the flange part but rather is provided radially within this contact surface with an axial ring groove which is preferably arranged concentric to the shaft part and likewise has features providing security against rotation such as ribs providing security against rotation and/or recesses providing security against rotation, preferably at its base region. A design of this kind serves in particular for a good accumulation of material in the region of the hole margin and for a good security against rotation, without weakening of the component in the region of the attachment of the hollow element.

The hollow tip can be kept in the passage by a light press fit which does not damage the thread or by a weak adhesive bond or by a magnetic force. In this way it is ensured that the combination of a hollow element with an auxiliary tip is kept together during transport, handling and processing until the auxiliary tip is intentionally removed, which can then take place easily.

It is particularly favorable when the auxiliary tip has a cylindrical region which can be introduced into the passage of the hollow element and has, between the conically converging tip and the cylindrical region, a ring shoulder which can be brought into engagement against the free end of the shaft part or of the rivet section prior to the piercing of the component. This auxiliary tip can be introduced in the direction of the longitudinal axis from the free end of the shaft part or of the rivet element into the passage and the auxiliary tip is then supported at the said free end.

It is particularly favorable when the hollow element merges behind the conically converging tip, which has a maximum diameter which corresponds to or is somewhat less than the outer diameter of the shaft part or of the rivet part, via a neck into a portion of smaller diameter which is received in the thread cylinder or in the passage. With this design, the auxiliary tip can also serve for the formation of a rivet bead when the curvature of the neck is so differently selected from the shape of the free end of the rivet section at the inner side that a gap is first present there. During the exertion of force on the auxiliary tip in the direction of the longitudinal axis and in the direction towards the flange part this tip can then be axially displaced relative to the shaft part or to the rivet section, whereby the gap is at least approximately closed and the rivet section is deflected radially outwardly and reshaped into a rivet bead. In this way a special rivet die is not necessary and the attachment process can be designed very simply.

In an alternative embodiment in which a hollow element is provided with an internal thread the auxiliary tip can have an external thread which is screwed into the internal thread.

A design is likewise possible in which the auxiliary tip is formed as a preceding hole punch which is guidable through the passage of the hollow element coming from the flange side. The hole punch, i.e. the hole punch with hole piercing tip can be repeatedly reused and it is not necessary to provide a separate auxiliary tip for each hollow element.

An embodiment is particularly to be recommended in which the free end of the hollow shaft part of the element or the free end of the rivet section has a conically converting shape which is matched to the conical shape of the auxiliary tip that is used. In this way a part of the piercing work can be carried out by a relatively small auxiliary tip which is passed, coming from the flange side of the hollow element, through the said passage, while a further part of the piercing work is carried out by the conically converging shape of the shaft part or of the rivet section. This embodiment also favors the use of a reusable preceding hole piercing tip which is guided through the said passage coming from the flange side.

In a further embodiment the auxiliary tip can have, behind the conically converging region, diverging spring tongues which end in a diverging shape at a diameter which corresponds to the outer diameter of the free end of the shaft part or of the free end face of the conically converging shape of the free end of the shaft part or of the rivet section, with the spring tongues being capable of being pressed inwardly after the piercing of the component. In this way a gentle transition can be provided from the conically converging region of the auxiliary tip to the conically converging region of the shaft part or of the rivet section.

In this connection the auxiliary tip can have a cylindrical extension to the rear which is guided in a hollow insert which is arranged and screwed into the passage of the hollow element. In this way the auxiliary tip can be stably guided and the hollow insert or the guide sleeves can support the spring tongues.

The hollow element can also be used in combination with a tool which brings about an axial movement of the hollow element with the auxiliary tip and/or of the auxiliary tip alone, with the tool being selected from the group press, setting head, robot, tongs, C-frame with power cylinder, and with the component preferably being supported during the piercing either free-standing or supported on a die button, for example a riveting die.

Furthermore, the hollow element can be used in cooperation with a heater which heats the component in the region of the piercing to a matrix material dependent temperature at which the matrix material of the composite material does not melt but rather softens or becomes pasty, for example to a temperature of 260° C. when the material is PA6.

The invention will be explained in more detail in the following with reference to embodiments and to the drawings in which are shown:

BRIEF DESCRIPTION OF THE FIGURES

FIGS. 1A-1E a representation of a first hollow element in form of a nut element with an auxiliary tip and indeed in a perspective view from above (FIG. 1A), in a perspective view from below (FIG. 1B), in a plane view from below (FIG. 1C), in a representation partly sectioned in the longitudinally direction (FIG. 1D) and in a plan view from above (FIG. 1E), FIGS. 2A-2E the attachment of the hollow element with an auxiliary tip of FIGS. 1A to 1E to a component consisting of composite material and indeed in a partly sectioned representation of a section of a component (FIG. 2A), the penetration of the component by the auxiliary tip (FIG. 2B), a drawing similar to FIG. 2B in which however the rivet section of the hollow element has entered into the hole region of the component (FIG. 2C), the use of a die button in order to form the rivet section of the hollow nut element into the rivet bead (FIG. 2D) and the finished component assembly consisting of the component to which the hollow element is riveted (FIG. 2E), FIGS. 3A-3E a series of drawings corresponding to the series of drawings of FIGS. 1A-1E with an alternative embodiment of the auxiliary tip, FIGS. 4A-4D a series of drawings to represent the attachment of the hollow element in accordance with FIGS. 3A-3E to a component corresponding to the representations of FIGS. 2A, 2B, 2C and 2E of the series of drawings of FIGS. 2A-2E, FIGS. 5A-5E a further drawing corresponding to FIGS. 1A-1E but without an auxiliary tip and with a special shape of the rivet section, FIGS. 6A-6C a representation of a first variant for the attachment of the nut element in accordance with FIGS. 5A-5E to a component consisting of composite material using an auxiliary tip in the form of a screwed in pin with tip and indeed in a first representation in which the hollow element of FIGS. 5A-5E is arranged with an auxiliary tip above the component (FIG. 6A), a representation in which the hollow element with the auxiliary tip has been pressed through the component to such an extent that the particularly shaped region of the rivet section is located in the component (FIG. 6B) and a representation with the finished component assembly consisting of the hollow element riveted to the component (FIG. 6C), FIGS. 7A-7C a further series of drawings similar to the series of drawings 6A-6C but with the representation of an alternative auxiliary tip and FIGS. 8A-8E an alternative possibility for the attachment of a nut element in accordance with FIGS. 1A-1E to a component consisting of composite material which has been prepierced.

DETAILED DESCRIPTION OF THE INVENTION

Figure 1A:
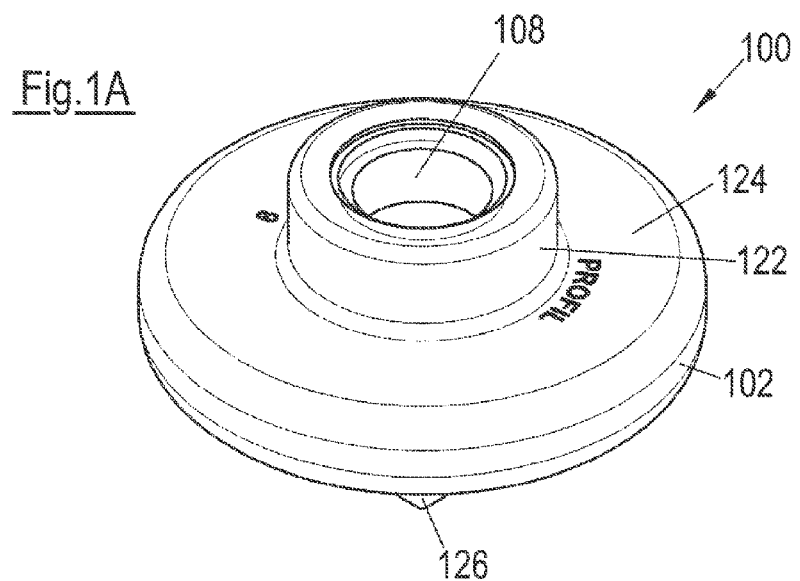

Referring first of all to FIGS. 1A-1E a first example for a hollow element is shown in the form of a nut element 100 which has a flange part 102 and a shaft part 104 extending away from the flange part. The shaft part 104 is formed here as a rivet section 106. The nut element 100 further has a central passage 108 which is arranged concentric to the central longitudinal axis 110 of the hollow element and is provided with a thread cylinder 112.

As is in particular evident from FIGS. 1C and 1D, the nut element 100 has an annular contact surface 114 at the side of the flange part 102 adjacent to the shaft part and a ring groove 116 is located radially within this contact surface 114 and surrounds the shaft part 104. In the base region of the groove 116, which is here approximately rectangular in cross-section, there are ribs 118 providing security against rotation which fully bridge the base region of the ring groove 116. The ribs 118 are smaller in height than the depth of the groove 116 from the annular contact surface 114. The transition of the ring groove into the annular contact surface 114 is shown here with a rounded edge. Other shapes for such ring grooves are well known in the field of sheet metal processing and from patent applications of the present applicants and can be used as desired. It should be noted that the present invention is in no way restricted to the use of a nut element 100 in accordance with FIGS. 1A to 1E or in accordance with the further Figures of this application but rather all hollow elements can be considered which have the basic design which is set forth for the hollow element in claim 1. I.e. the present invention can as well be used or realized with all such elements.

Furthermore, smaller raised portions 120 in plan view are located on the annular contact surface 114 and are preferably flattened off at their upper sides.

Above the flange 102 in the representation in accordance with FIG. 1D there is a cylindrical projection 122 with a part of the threads 112 being formed within this projection 122, while the further part is located in the region of the flange part 102. The cylindrical projection 122 merges into the flange part 102 but is of smaller diameter than the shaft part 102, whereby an annular surface 124 arises concentric to the central longitudinal axis 110. This surface 124 represents a so-called driven surface, i.e. a surface on which pressure can be exerted when the element is incorporated into a component, without the danger existing that the thread is deformed by the forces that are exerted or that the element is otherwise damaged.

Figure 1B:
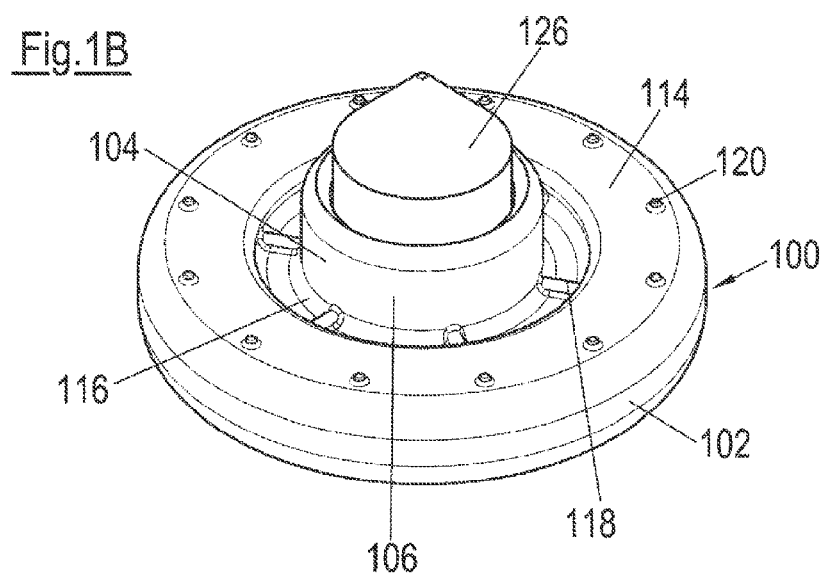

The general shape of the element as shown in FIGS. 1A-1B is known per se in the form of an RND element of the company Profil Verbindungstechnik GmbH & Co. KG, apart from the specific dimensions and above all the broad contact surface 114 and the small raised portions 102 outwardly on the annular contact surface 114 which here offer a good security against rotation. The flange part 102 has an approximately ball-like shape which is likewise known for the RND element.

The nut element 100 of FIGS. 1A-1E is supplemented by an auxiliary tip 126 which can best be seen from FIG. 1D. One notes that this auxiliary tip has a conical front tip part 128 converging to a point at the front end. The conical tip merges at its end remote from the point into a rounded neck 129 the minimum dimension of which corresponds to the cylindrical inner diameter of the section 106. The neck 129 merges via a ring step 131 into a cylindrical section 133 which has a light press fit within the thread cylinder 112 or is held there by magnetic force. Thus the tip cannot be lost.

In this embodiment the auxiliary tip 126 is inserted from the side of the free end of the shaft part 104, i.e. of the rivet section 106, into the passage 108 such that the conically converging region 180 of the auxiliary tip projects from the free end of the shaft part or of the rivet section 106. One sees that the broadest diameter of the conically converging region 128 of the auxiliary tip 126 has the same diameter as the outer diameter of the rivet section 106.

The attachment of the above-described hollow rivet element with the auxiliary tip to a component consisting of a composite material will be described in more detail with reference to the series of drawings of FIGS. 2A-2E.

Figure 2A:
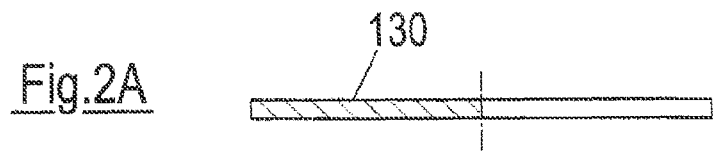

The FIG. 2A shows first of all a section of a component 130 of a composite material in a partly sectioned representation.

The component can be a three-dimensional component, for example in the form of a wing or of a bumper or a console or the like, with only a flat region of the component being shown here, although it is not essential that the region is absolutely straight, but rather it could also be a component with a slight curvature in the region of the attachment of the nut element 100.

Figure 2B:
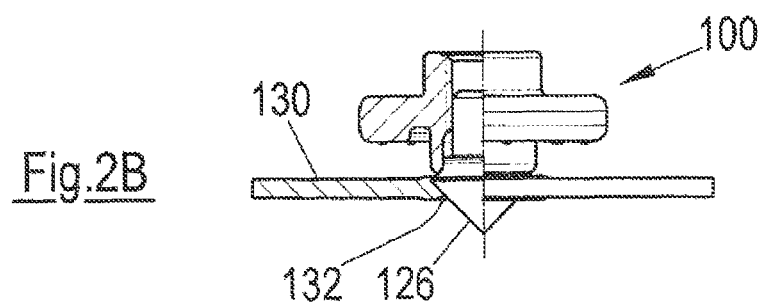
Figure 2C:
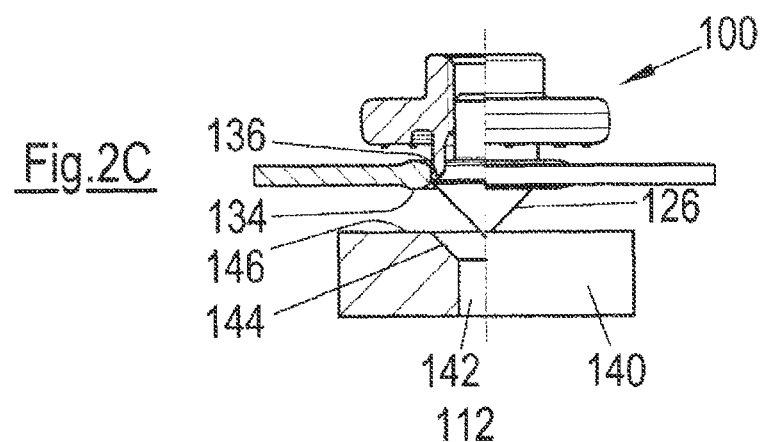
Figure 2D:
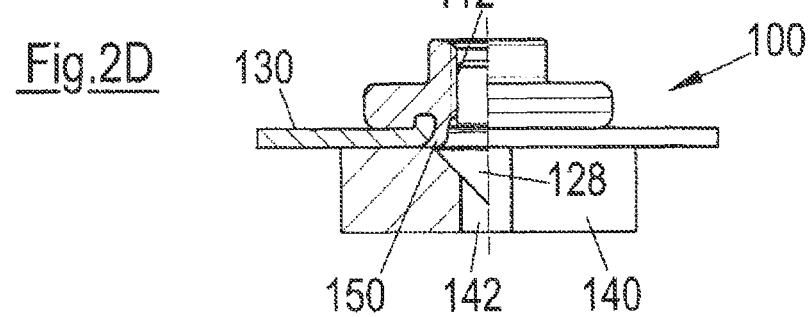

The combination consisting of the nut element 100 and the auxiliary tip 126 is pressed with the tip 126 to the fore against the component 130 and the tip is pressed through the component, as can first be seen in FIG. 2B. In this way a hole 132 arises in the component 130 and the material which is displaced by means of the tip builds up at the underside and at the upper side of the component 130 in the form of thickened portions 134 and 136, as shown in FIG. 2C. In FIG. 2C one can further see that the rivet section is now just about to be fully received in the hole 132. Furthermore one can see in FIG. 2C a die button 140 with a central passage 142 and a conical recess 144 which receives the tip. During further downwardly directed movement of the nut element 100 the auxiliary tip 126, i.e. its conically converging region 128, enters into full area contact against the conical recess 144 of the die button 140 and annular contact surface 114 enters into contact against the upper side of the component 130. Furthermore the planar upper end face 146 of the die button 140 comes into contact with the underside of the component 130 as shown in FIG. 2D. Through the corresponding movement of the nut element 100 towards the die button 140 the material which is located in the region of the raised portions 134 and 136 is shifted or displaced so that it completely fills out the ring groove 116 and enters into full area contact against the ribs 116 providing security against rotation. Furthermore, the noses 120 providing security against rotation are pressed into the upper side of the component 130. Moreover, through this movement of the nut element 100 towards the die button, the auxiliary tip 126 is pressed downwardly, whereby the neck 129 reshapes the rivet section 106 to a rivet bead 150 as is shown in FIG. 2D and in FIG. 2E. It is particularly favorable when the hollow element has a maximum diameter behind the conically converging tip which corresponds to the outer diameter of the shaft part or of the rivet section or is somewhat smaller and merges via a neck into a section of smaller diameter which is received in the thread cylinder or in the passage. With this design the auxiliary tip can, as already mentioned, also serve for the formation of the rivet bead, in particular when the curvature of the neck is selected to be so different from the shape of the free end of the rivet section at the radially inner side that a gap is initially present there. During the exertion of a force on the auxiliary tip in the direction of the longitudinal axis, in the direction towards the flange part, this auxiliary tip can be displaced axially relative to the shaft part, i.e. to the rivet section, whereby the gap is initially approximately closed and the rivet section is deflected radially outwardly and reshaped into a rivet bead. It is eventually sufficient when the neck has the same shape as the inner side of the free end of the rivet section, so that no gap is present, since the radius of the neck can also be sufficient in order to bring about the formation of the rivet bead. Thus a special riveting die is not necessary and the attachment process can be made very simple.

Figure 2E:
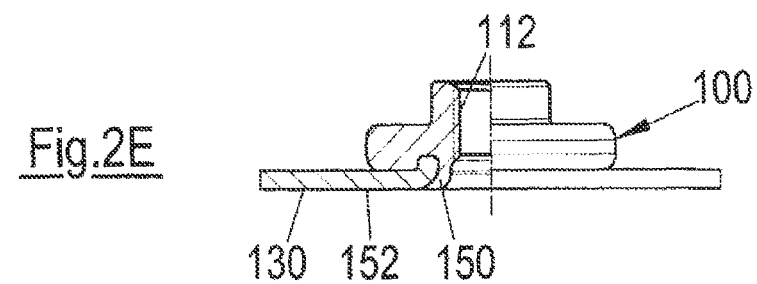
Figure 3A:
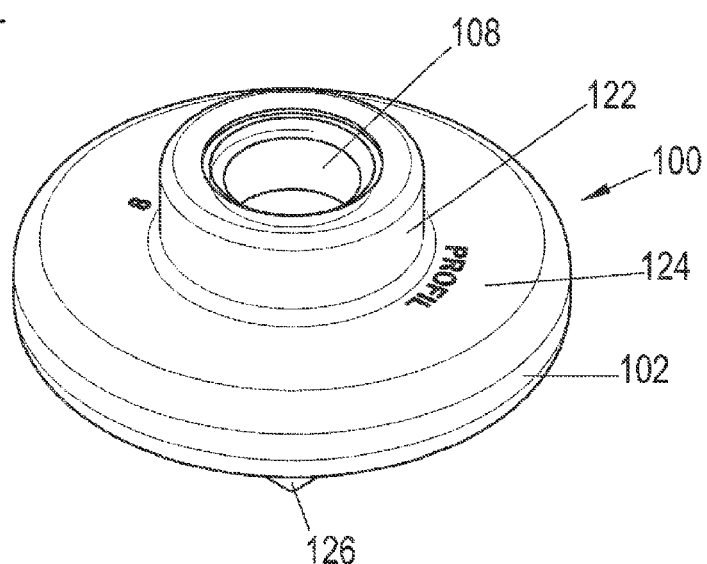
Figure 3B:
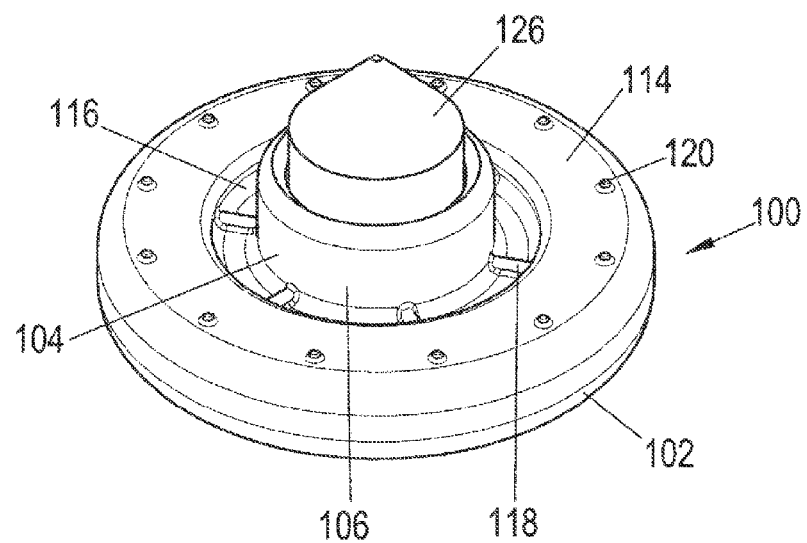

The die button and the auxiliary tip can then be removed and the finished component assembly consisting of the nut element 100 riveted to the composite component 130 is then formed as shown in FIG. 2E. One notes that the underside 152 of the component 130 in FIG. 2E lies in one plane, at least in the region of the nut element 100. In this way a planar screw-on surface is provided so that a further component (not shown) can be screwed onto the component 130 from the underside and indeed by means of a bolt element which is screwed through the further component and through the rivet bead into the thread 112 of the nut element 100.

When, in this description, there is talk of "underside" and "upper side", "below" and "above" or similar, this manner of designation is solely to be related to the geometric representation and does not represent any restriction of the geometrical arrangement. It would, for example, be straightforwardly possible to secure the nut element 100 coming from below onto the component 130 or in any desired inclined position when the local plane of the component 130 has a correspondingly inclined position.

The piercing of the composite component in accordance with the series of drawings of FIGS. 2A-2E takes places as a rule as a temperature at which the matrix material of the component 130 is soft or pasty, for example at 260° C. for PA6 (polyamide 6). As the component is soft in this state the forces which are required in order to press the tip through the component are relatively small and a particular support of the component is not absolutely necessary. Instead the component can, so to say, be pierced free standing. On the other hand, nothing speaks against supporting of the component during the piercing on a corresponding die button, for example on the die button which is shown in the simultaneously filed German patent application DE 10 2012 001 067.2, which forms the basis of U.S. patent application Ser. No. 13/745,080, the content of which is made part of the content of the present application.

In the following further embodiments of the invention will be described and in this further description the same reference numerals will be used for features or functions which have already been described. It should be understood that the previous description also applies for the further embodiments unless something to the contrary is stated. Thus, the description will not be unnecessarily repeated.

The FIGS. 3A-3E show the same nut element 100 as in the drawings of FIGS. 1A-1E but here a differing auxiliary tip 126 is used. One sees, in particular from FIG. 3D, that the conically converging region 128 of the auxiliary tip 126 again converges to a point but here has a maximum diameter which corresponds to the inner diameter of the cylindrical part of the hollow rivet section 106. This diameter emerges via a ring step 160 into a thread part 162 which is screwed into the internal thread 112 of the hollow nut element 100.

The attachment of the combination of the nut element 100 with the auxiliary tip 126 in accordance with FIGS. 3A-3E to a component 130 takes place in similar manner to the attachment of the combination in accordance with FIGS. 1A-1E, with the attachment being specifically shown in FIGS. 4A-4D.

Since the maximum diameter of the conically converging region 128 of the auxiliary tip 126 corresponds to the internal diameter of the hollow rivet section the piercing is partly effected by the conically converging region of the auxiliary tip and partly by the free end of the rivet section. This is however unproblematic, since the rivet section is rounded at its free end and is able to assist the conically converging region 128 of the auxiliary tip 128 during the carrying out of a piercing and to take care of the final dilation of the hole pierced in the composite component. It is uncritical when the slight discontinuity between the conically converging region 128 of the auxiliary tip 128 and the free end face of the rivet section 106 leads to a material displacement downwardly, because this material forms part of the thickened portion 134 and is finally pressed upwardly again and flat by the die button 140.

Figure 4A:
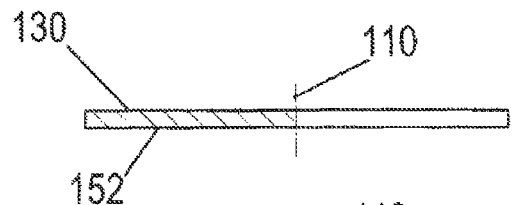
Figure 4B:
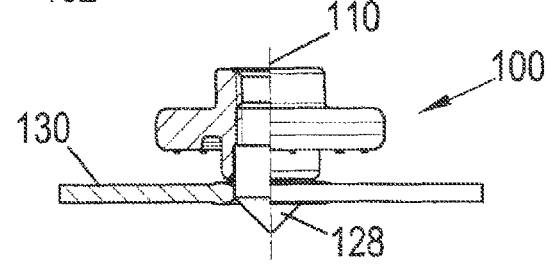
Figure 4C:
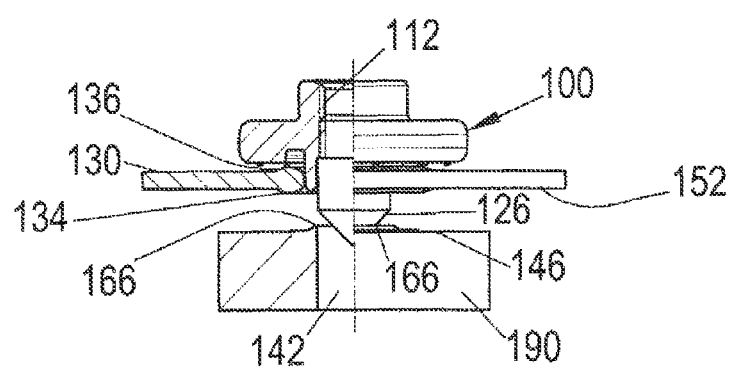
Figure 4D:
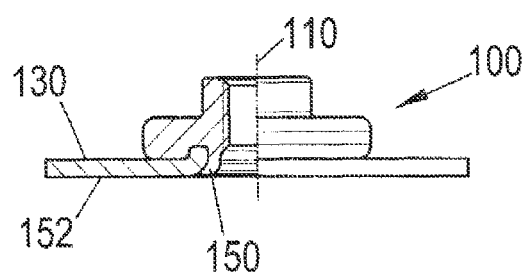
Figure 5A:
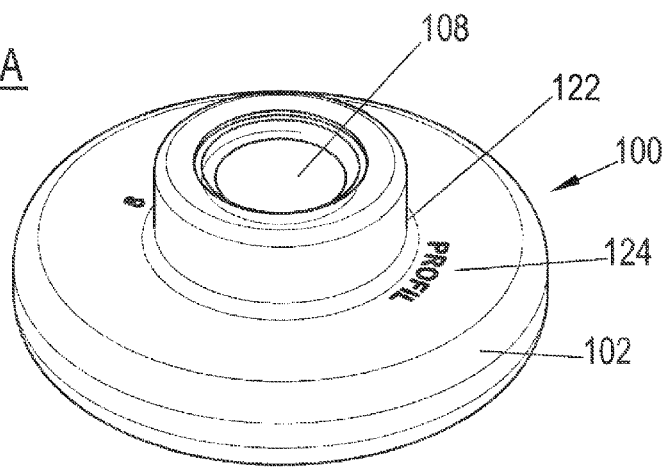
Figure 5B:
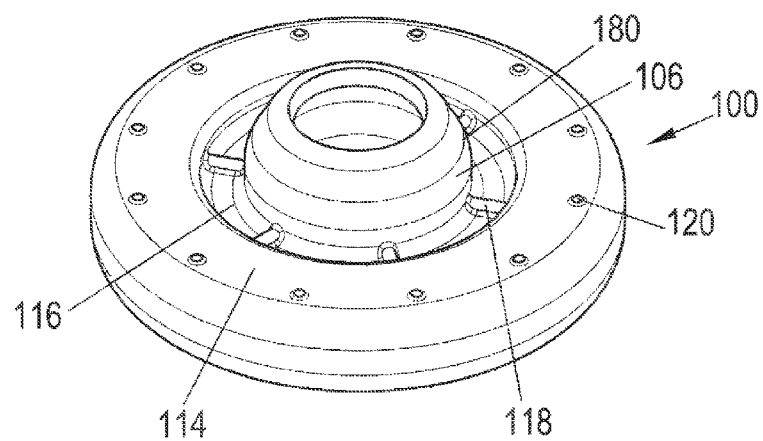
Figure 5C:
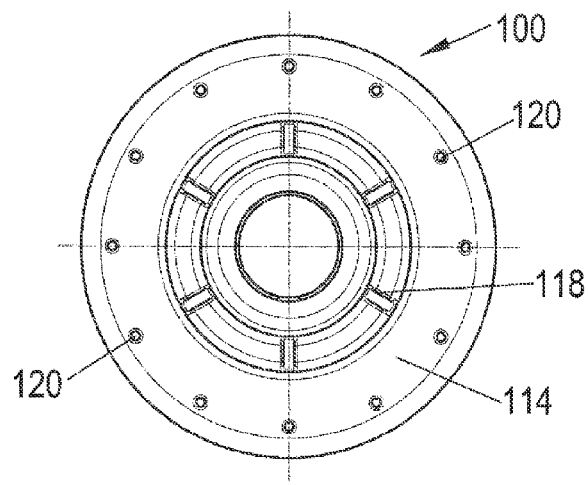
Figure 5D:
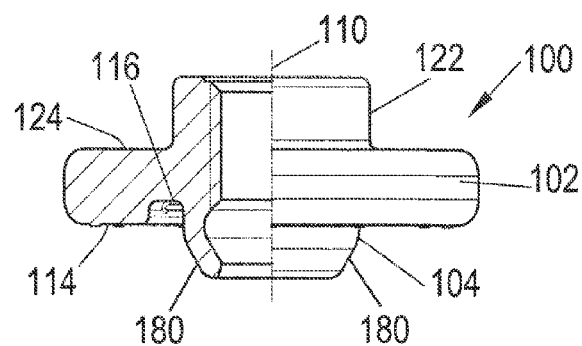
Figure 5E:
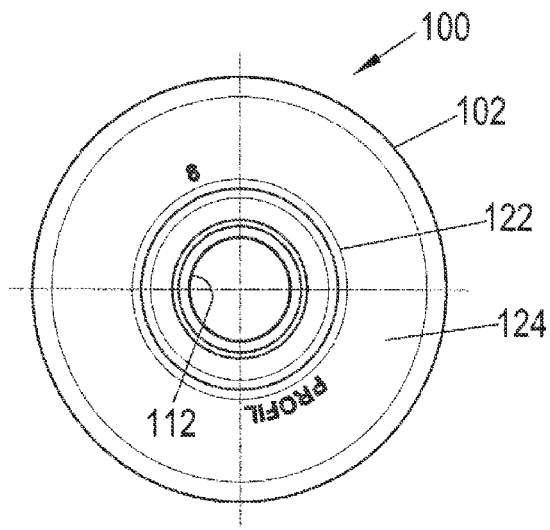

When the nut element with the rivet section has been pressed into the component sufficiently far that the state of FIG. 4C is achieved then the component is supported at its underside 152 by means of a die button placed from below and the nut element 100 is pressed from above onto the die button 140. The free end 146 of the die button also presses here against the free end face 152 of the component and it displaces the material of the raised portions 134 and 136 into the ring groove of the nut element 100 and presses the underside of the component flat. In distinction to the representations of FIGS. 2A-2E the die button 140 is provided here with a ring nose 166 which extends around the central passage 142 of the die button and is arranged concentric to the longitudinal axis 110. This passage 142 has an internal diameter which corresponds to the maximum diameter of the auxiliary tip 126 or is fractionally larger. The ring nose 166 engages at the inner side of the hollow rivet section 104, favored by the curved shape of the free end of the rivet section and dilates the rivet section 106 into the rivet bead 150 as is shown in FIG. 4D.

Here a planar screw-on surface in accordance with the reference numeral 152 also arises. After the completion of the rivet connection between the component 130 and the hollow nut element 100 a component assembly results, as shown in FIG. 4D, which is identical with the component assembly of FIG. 2E. It is naturally necessary here to unscrew the auxiliary tip 126 again so that the component assembly in accordance with FIG. 4D adopts the final form and a further component can be screwed onto the planar screwing surface 152 as described in connection with the previous embodiment. In this embodiment also the attachment takes place at an elevated temperature so that the matrix material of the composite material is soft or pasty and/or can be brought into form-fitted interlock with the nut element 100 without damaging the fiber reinforcement.

At this point it should be stated that in all the embodiments described here the use of an auxiliary tip is also favorable because the tip damages no fibers or only a few fibers during the piercing of the component 130. Instead it rather much more displaces the fibers, whereby not only a thickened portion of the component arises in the region around the pierced hole, as well as a high concentration of the reinforcing fibers in the area of the form-fitted attachment of the nut element, but rather also the fibers experience a certain stretching so that the composite material in the region of the attachment to the nut element 100 has a permanent compressive stress which is favorable for the prevention of fatigue cracks.

Here also the attachment of the nut element can be carried out so to say free standing, i.e. the component 130 is not supported or is only supported in a primitive way and means, or is supported with the aid of a support, which can be formed as a die button and indeed as described above in accordance with the simultaneously filed German patent application DE 10 001 067.2.

It is entirely possible to supply the nut element 100 together with the auxiliary tips by means of an automatic feed system to the component 130. This can, for example, take place using a setting head known per se which is used for the attachment of RND elements to sheet metal parts. In similar manner to an RND setting head the components 130 can be introduced in a press and can be supported on the lower tool of the press, or on a suitable die button. The nut element 100, with the auxiliary tip 126 to the fore, is attached to the components, on the closing of the press, by the setting head which is carried by the upper tool of the press or by an intermediate plate of the press. It is, however, not essential to use a press here but rather the setting head can be used, for example, in a type of arbor press or in an apparatus similar to a pillar drill (drill press) (without rotation of the setting head), because the soft state of the component 130 does not make any high piercing forces necessary. The nut elements can also be attached by means of a robot, or in a C-frame equipped with a power cylinder, or by means of suitable tongs, or otherwise, to the components 130.

Figure 6A:
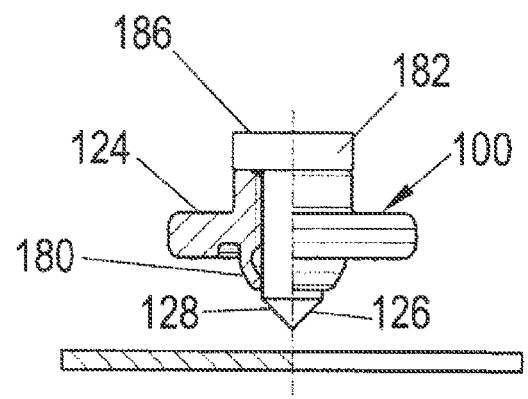
Figure 6B:
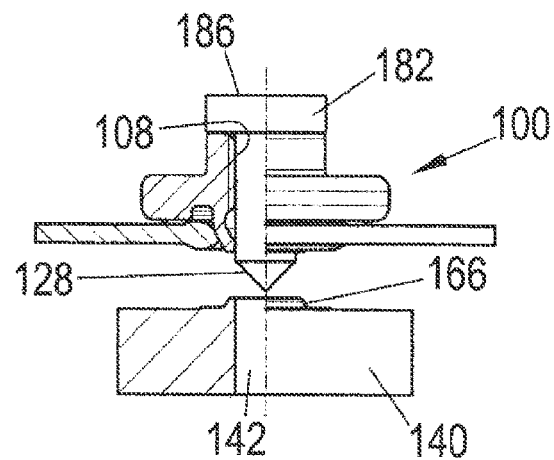
Figure 6C:
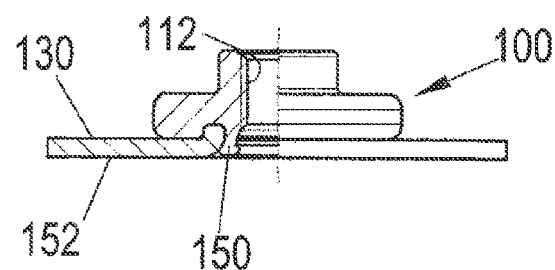

A further embodiment of the nut element 100 is shown in the FIGS. 5A-5E. The nut element 100 of FIGS. 5A-5E differs from the previously described nut element only in that the rivet section has been shaped as a truncated cone, i.e. the rivet section 106 has here a conically converging region 180. This shape is particularly favorable because the truncated cone region 180 of the rivet section 106 can be used for a part of the piercing process. For example, the FIGS. 6A-6C show how an auxiliary tip in the form of a bolt-like pin 182 without a thread can be pressed through the central passage 108 of the hollow nut element 100 and indeed from the side of the nut element 100 remote from the rivet section. In this way the conically converging region 128 of the auxiliary tip 126 leading to a point at the free end projects beyond the free end of the conical region 180 of the rivet section and represents an extension of the conical surface of the conical region 180. Only a small discontinuity is present at the transition from the conically converging region 128 into the conical region 180. FIG. 4B then shows how both conical regions, i.e. 128 and 180 are simultaneously (or immediately sequentially) used in order to pierce the component 130. As shown in FIG. 6B a die button with a ring nose 166 is used. In similar manner to the embodiment in accordance with FIGS. 4A-4D this ring nose 166 is able to engage the inner side of the conical region of the rivet section and to form this into a rivet bead 150 as is shown in FIG. 6C. Here the rounded end face of the free end of the rivet section also favors the engagement with the ring nose 166 which, as previously, has an inclined surface at the outer side which favors a sliding movement of the rivet section and the formation of the rivet bead 150.

When using an embodiment in accordance with FIGS. 6A-6C the nut element 100 can also be supplied by means of a setting head, and here pressure is not only exerted on the driven surface 124 of the nut element 100 but rather also, or instead of this, on the end face 186 of the head part of the bolt-like auxiliary tip 126. After the completion of the component assembly in accordance with FIG. 6C the auxiliary tip is withdrawn upwardly out of the component assembly.

A further not shown possibility consists in using an auxiliary tip which is formed as a preceding hole punch. Such preceding hole punches are used in the field of sheet metal processing in order to rivet hollow functional elements to sheet metal parts and have there the task of punching a piercing slug from the sheet metal part with a diameter which corresponds at least substantially to the diameter of the preceding hole punch. This corresponds in turn to the core diameter of the thread cylinder contained in the functional element. Such preceding hole punches in the prior art have however a planar end face, since one cuts out a circular piercing slug from the sheet metal part by means of the hole punch. During the attachment of functional elements to sheet metal parts using preceding hole punches, the preceding hole punch is pressed through the center of the nut element and through the sheet metal part in the same stroke of the press which is used for the riveting of the nut element to the sheet metal part. After the completion of the piercing the riveting section of the nut element forms the sheet metal part into a conically downwardly directed collar. The free end of the rivet section ultimately passes through the opening at the free end of the collar and is beaded over outwardly around the free end of the collar by the riveting die, which simultaneously functions as the piercing die, in order to form the rivet connection.

In the use of a preceding hole punch or, more precisely stated, a preceding piercing tip for the present invention the piercing tip is admittedly moved in a similar manner but is equipped with a conically converging region 128 at its free end which converges to a point and which operates as an auxiliary tip and does not generate any piercing slug. Instead it forms the corresponding hole 132 by displacement of material of the component 130. The use of such a preceding hole punch with piercing tip is advantageous because a large number of components can be pierced with one and the same punch whereas, when using an auxiliary tip of the previously described form, the part which is termed the auxiliary tip has to be removed from the corresponding element after each piercing and can either be disposed of as waste or can be reused with a certain effort.

Figure 7A:
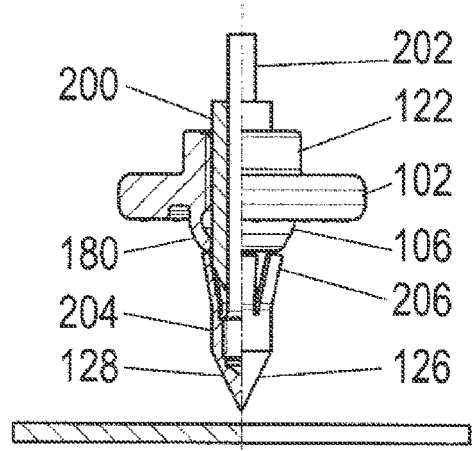
Figure 7B:
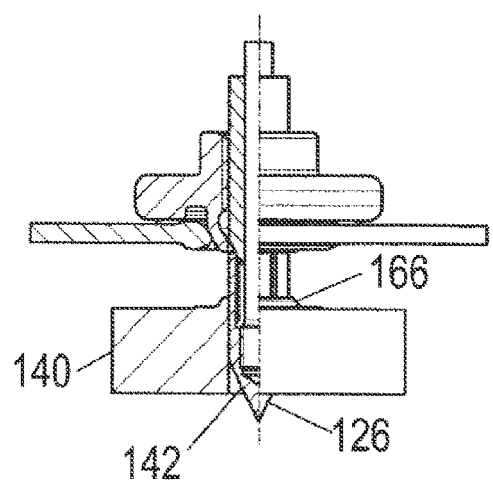
Figure 7C:
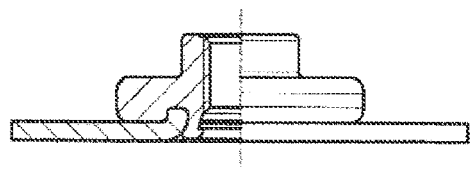
Figure 8A:
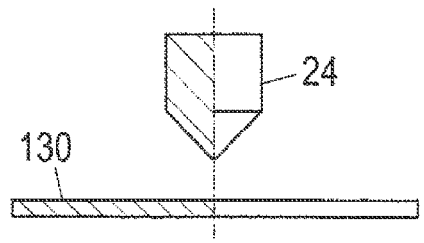
Figure 8B:
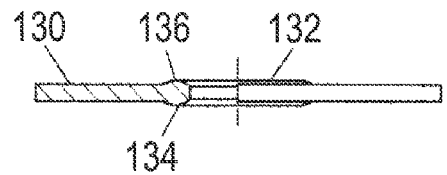
Figure 8C:
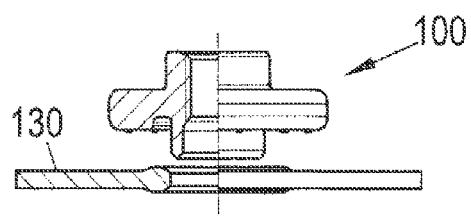
Figure 8D:
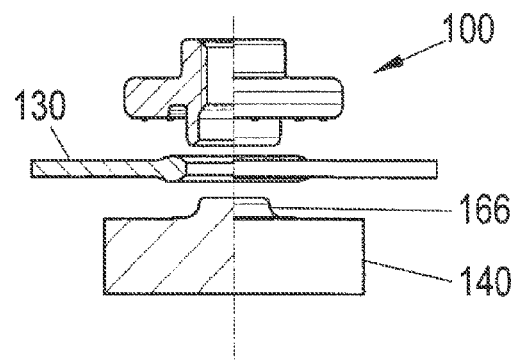
Figure 8E:
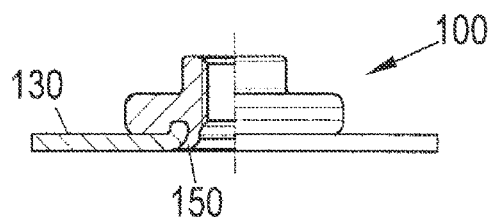

A further possibility of using the element of FIGS. 5A-5E is shown in the FIGS. 7A-7C.

The auxiliary tip 126 in accordance with FIGS. 7A-7C is of two-part design, it includes not only the actual part with the conically converging region 128 but rather also a cylinder part 200 which is introduced into the passage 108 with a slight press fit or is otherwise positioned there, for example by means of a setting head (not shown) which supplies the nut element to the component 130. The cylinder part 200 serves as a guide for the cylindrical shaft part 202 of the "front" auxiliary tip 126.

Behind the conically converging region 128 of the front auxiliary tip 126 there is a hollow cylindrical region 204 in which the lower end of the shaft part 202 is received, for example by means of an outer thread at the lower end of the shaft part 202 and an internal thread in the cylindrical region 204 of the front auxiliary tip 126. A thread connection of this kind is however not essential but rather this could be an adhesively bonded connection or a press fit and the shaft part 202 can also be integral with the front auxiliary tip 126.

Behind the conically converging region 128 and in the illustrated form behind the preferably provided cylindrical region 204, the auxiliary tip has diverging spring tongues 206. These diverging spring tongues 206 extend in a diverging shape starting from the diameter of the cylindrical region 204, or from the maximum diameter of the conically converging region 128 of the auxiliary tip 126, end ending at a diameter which corresponds to the outer diameter of the conically converging region 180 of the rivet section 106.

The piercing of the component 130 initially takes place through the conically converging region 128 of the tip which converges to a point and then through the diverging shape of the spring tongues 206 and finally by the conical region 180 of the rivet section 106 as can easily be understood from FIGS. 7A and 7B.

After or during the piercing of the component 130, the front end of the auxiliary tip 126 is guided in the central passage 142 of the die button 140 which is provided with a ring nose 166 in the same way as the die button 140 of FIG. 6B. Through the axial movement of the shaft part 202 of the front auxiliary tip 126 relative to the cylindrical guide 200 the spring tongues 206 release from it. During the further movement through the hollow passage 142 of the die button 140 the spring tongues are pressed from the diverging shape in accordance with FIG. 7A into an axially parallel position in accordance with FIG. 7B. In this way, the free end of the rivet section 104 is exposed for the ring nose 166 for the die button 140 to such an extent that the ring nose 166 can act on the inner side of the rivet section and deform this radially outwardly into a rivet bead. In other words, the die button 140, i.e. its ring nose 166, also serves in this example to form the conical region 180 of the rivet section 106 into a rivet bead 150, as is shown in FIG. 7C.

The auxiliary tip 126 together with the guide sleeve 200 and the shaft part 202 can now be completely removed downwardly through the central passage 108 of the die button and reused. It is, however, even more favorable to draw the auxiliary tip 126, together with the guide sleeve 200 and the shaft part 202, out upwardly from the finished component assembly consisting of the nut element 100 and the component 130 through the hollow passage 108 of the nut element 100, which can be brought about by means of a setting head.

As the parts 126, 200 and 202 are arranged in the setting head and can, in some phases of the attachment process, be moved during a single working stroke of the tool that is used (for example a press) with the setting head and, in other phases, can be moved relative to the setting head and relative to one another (i.e. a relative movement of the guide sleeve 200 on the one hand and of the front auxiliary tip 126 with the shaft part 202 on the other hand) a fully automated process can be carried out. Thus the auxiliary tip 126, together with the guide sleeve 200 and the shaft part 202, can be introduced for renewed use into the central passage 108 of a new nut element 100 which is supplied to the setting head via a supply means known per se.

Only when the rivet bead 15 has been formed can the auxiliary tip, i.e. the parts 126, 200 and 202 be withdrawn simply upwardly out of the nut element by means of the setting head. The die button ensures that the spring tongues retain their axially parallel position in which they lie within an imaginary cylinder with a diameter smaller than the internal diameter of the thread cylinder 112. Thus the auxiliary tip 126 with the parts 200 and 202 can be straightforwardly drawn upwardly out of the element. This is particularly favorable because the one-, two- or three-part auxiliary tip (depending on the specific design) can then be reused, in a similar manner to a preceding hole punch.

In this variant the conical region 180 of the rivet section also makes a contribution to the piercing operation. The auxiliary tip 126 of the FIGS. 7A and 7B can, however, also be used with a rivet section without a conical region 180. It is likewise conceivable to make the auxiliary tip in accordance with FIGS. 7A and 7B in one piece (not shown). The two-piece design is, however, advantageous when the guide sleeve 200 in FIG. 7A can be pressed downwardly in relation to the front auxiliary tip to an axial position in relation to the nut element and to the front auxiliary tip 126. In this way the conical region at the lower end of the guide sleeve 200 can press the spring tongues outwardly, or support them in their outwardly sprung position and hold them at or bring them to a diameter which corresponds to the diameter at the free end region of the conical region 180 of the rivet section 106. In this way, a gentle transition is provided from the diameter of the cylindrical region 204 of the front tip to the conical region 180 of the rivet section, which is favorable for the hole formation.

The guide sleeve 200 is however not absolutely essential, the shaft part 202 of the auxiliary tip 126 could be guided directly in the central passage 108 of the nut element and the free ends of the spring tongues supported at the free end of the rivet section, if such a support is at all necessary and the inherent stiffness of the spring tongues is not on its own sufficient in order to prevent a pronounced resilient deflection of the spring tongues radially inwardly during the hole formation.

It is pointed out that the nut elements in accordance with FIGS. 1A-1E can also be attached without an auxiliary tip in an otherwise pre-pierced component 130, as is shown in series of drawings of FIGS. 8A to 8E. Stated briefly, the component 130 is pre-pierced in FIG. 8A by means of the pointed tip 24 and it then has the pre-pierced state in accordance with FIG. 8B. Then the nut element 100 with the rivet section to the fore is inserted from above through the hole 132 of the component 130 and the rivet section is reformed to the rivet bead by means of a die button coming from below in accordance with FIG. 8D and the two raised portions 134 and 136 are simultaneously so crushed that the material present there flows into the ring groove and is brought flat against the inside 152 of the component 130 and into contact with the ribs 118 providing security against rotation within the ring groove 116, with the noses 120 providing security against rotation simultaneously being pressed into the surface of the component 130. The die button 140 in this embodiment does not require a central passage and the nose 166 is not ring-shaped here but rather post-like. The result in accordance with FIG. 8E corresponds also the previous result in accordance with FIGS. 2E, 4D, 6C and 7C.

It is further pointed out that when pre-piercing the composite component this pre-piercing can not only be carried out by means of a tip but rather it would also be conceivable to carry out a drilling process or a punching process for which the component not necessarily have to be pre-heated. It is also conceivable to provide the hole 132 in the component with raised portions 134 and 136 already during the manufacture of the component by using a suitable mold.

In all embodiments it is to be noted that the hollow element does not necessarily be formed as a rivet element. The shaft part 104 does not have to be formed as a rivet section 106 but rather the nut element could also have the form of a press-in element with undercuts for the form-fitted reception of the material of the composite material, whereby the required resistance to press-out and/or required security against rotation is achieved. Such undercuts can then be formed at the shaft part and/or between the shaft part and the flange part. Such designs are known per se for pressing elements in the field of sheet metal processing.

When the nut element used for the purpose of this invention is such a press-in element an auxiliary tip is nevertheless used to carry out the piercing process. The above given explanation also explains why a distinction is made in the main claim between the shaft part and the rivet section, quite apart from the fact that the rivet section can be formed at the end of a non-deformable or at least substantially non-deformable shaft part remote from the flange part, so that both a shaft part and also a rivet section can be present.

The invention claimed is:

1. A hollow nut element (100) for attachment to a component (130) comprising a composite material such as a fiber reinforced plastic part or a fabric reinforced plastic part, wherein the element has a flange part (102) and a and a rivet section (106) having an outer diameter and a free end and extending away from the flange part (102), wherein the hollow element furthermore has a central passage (108) and a thread cylinder provided in the hollow passage, wherein the hollow nut element (100) is used in combination with an auxiliary tip (126) which is inserted from the free end of the rivet section (106) into the passage such that a conically converging region (128) of the auxiliary tip (126) projects from the free end of the rivet section, the auxiliary tip (126) having, behind the conically converging tip (128), a maximum diameter which corresponds to or is somewhat smaller than the outer diameter of the rivet section (106) and merges via a rounded neck (129) into a portion (133) of smaller diameter which is received in the thread cylinder (112) or in the central passage (108).

2. The hollow nut element in accordance with claim 1, wherein features (118, 120) providing security against rotation are provided in the region of the flange part (102) in order to form a security against rotation between the hollow element (100) and the component (130).

3. The hollow element in accordance with claim 1, wherein the flange part (102) is provided with an annular planar contact surface (114) which is provided with discrete axial projections (120) which can be pressed into the matrix material of the component.

4. The hollow element in accordance with claim 1, wherein the flange part (102) is provided with an annular planar contact surface (114) and has, radially inside this contact surface, an axial ring groove (116) and wherein features providing security against rotation, such as ribs providing security against rotation (118) and/or recesses providing security against rotation, are provided at the base region of the axial ring groove.

5. The hollow element in accordance with claim 1, wherein a shaft portion is provided between the flange part and the rivet section.

6. The hollow element in accordance with claim 5, wherein the axial ring groove (116) is arranged concentric to the shaft part (104).

7. The hollow element in accordance with claim 1, wherein the auxiliary tip (126) is held by a press fit which does not damage the thread (112) or by a weak adhesive bond or by a magnetic force in the passage.

8. The hollow element in accordance with claim 1, wherein the auxiliary tip (126) has a cylindrical region (133) which can be introduced into the passage (108) of the hollow element and has the rounded ring shoulder between the conically converging tip (128) and the cylindrical region, with the ring shoulder being capable or being brought into contact against the free end of the rivet section (106) prior to the piercing of the component (130).

9. The hollow element in accordance with claim 1, wherein the free end of the rivet section (106), has a conically converging form (180) which is matched to the conical shape of the auxiliary tip (126) that is used.

10. An auxiliary tip (126) configured for use in combination with a hollow element (100) in accordance with claim 1.

* * * * *